United States Patent
Münch et al.

(10) Patent No.: US 11,612,102 B2
(45) Date of Patent: Mar. 28, 2023

(54) DRIVE SYSTEM FOR A HARVESTER

(71) Applicant: Deere & Company, Moline, IL (US)

(72) Inventors: Philipp Münch, Kaiserslautern (DE);
Giuliano Costantini, Kaiserslautern (DE); Timo Hinsberger, Marpingen (DE)

(73) Assignee: DEERE & COMPANY, Moline, IL (US)

( * ) Notice: Subject to any disclaimer, the term of this patent is extended or adjusted under 35 U.S.C. 154(b) by 372 days.

(21) Appl. No.: 15/929,585

(22) Filed: May 11, 2020

(65) Prior Publication Data
US 2020/0352100 A1    Nov. 12, 2020

(30) Foreign Application Priority Data

May 10, 2019 (DE) .......................... 102019206829.4

(51) Int. Cl.
*A01D 41/127* (2006.01)
*A01D 69/00* (2006.01)
(Continued)

(52) U.S. Cl.
CPC ......... *A01D 41/1274* (2013.01); *A01D 69/00* (2013.01); *A01D 75/182* (2013.01); *B60W 10/06* (2013.01); *B60W 10/30* (2013.01)

(58) Field of Classification Search
CPC .. A01D 41/1274; A01D 69/00; A01D 75/182; B60W 10/06; B60W 10/30
See application file for complete search history.

(56) References Cited

U.S. PATENT DOCUMENTS 4,663,714 A * 5/1987 Cornell ............... B60W 10/111
475/82
5,855,108 A * 1/1999 Salz .................... A01D 75/182
56/10.2 G
(Continued)

FOREIGN PATENT DOCUMENTS

CN         103443507 A * 12/2013 ............. F16H 47/04
CN         107521337 A * 12/2017 ......... A01D 41/1274
(Continued)

OTHER PUBLICATIONS

European Search Report issued in counterpart application No. 20172974.6 dated Dec. 3, 2020 (05 pages).
(Continued)

*Primary Examiner* — Luis A Martinez Borrero
(74) *Attorney, Agent, or Firm* — Hanley, Flight & Zimmerman, LLC

(57) ABSTRACT

A harvester comprising: a drive engine connected via a first drive train to ground engagement equipment of the harvester and via a second drive train to crop processing equipment of the harvester; an actuator configured to adjust the transmission ratio of the first drive train to control the propulsion speed of the harvester; and a controller configured to receive setpoint and actual values dependent on the crop throughput of the harvester, the controller configured to calculate an acceleration signal based on the setpoint and actual values, the acceleration signal representing an acceleration of the harvester suitable for minimizing the difference between the setpoint and actual values, and to determine a control signal for controlling the actuator based on the acceleration signal.

20 Claims, 6 Drawing Sheets

(51) Int. Cl.
    *A01D 75/18*           (2006.01)
    *B60W 10/06*          (2006.01)
    *B60W 10/30*          (2006.01)

(56) References Cited

U.S. PATENT DOCUMENTS

| | | | | |
|---|---|---|---|---|
| 5,995,895 | A * | 11/1999 | Watt | B60K 31/0066 |
| | | | | 56/10.2 G |
| 6,073,428 | A * | 6/2000 | Diekhans | B60K 25/00 |
| | | | | 123/352 |
| 6,430,904 | B1 * | 8/2002 | Goers | A01D 75/182 |
| | | | | 56/10.2 A |
| 7,452,267 | B2 * | 11/2008 | Bundy | A01D 75/182 |
| | | | | 460/6 |
| 7,520,806 | B2 * | 4/2009 | Bundy | A01D 41/1274 |
| | | | | 56/11.2 |
| 8,161,718 | B2 * | 4/2012 | Bussmann | A01D 41/127 |
| | | | | 56/10.2 G |
| 9,725,090 | B2 * | 8/2017 | Komatsu | B60W 10/101 |
| 9,776,615 | B2 * | 10/2017 | Matsuzaki | B60W 10/30 |
| 10,039,234 | B2 * | 8/2018 | Missotten | A01D 69/005 |
| 10,753,322 | B1 * | 8/2020 | Noonan | F02M 35/164 |
| 2008/0015759 | A1 * | 1/2008 | Byttebier | F16H 61/478 |
| | | | | 477/46 |
| 2008/0234016 | A1 * | 9/2008 | Bundy | A01D 75/182 |
| | | | | 460/2 |
| 2008/0234017 | A1 * | 9/2008 | Bundy | A01D 41/1274 |
| | | | | 460/98 |
| 2009/0126327 | A1 * | 5/2009 | Bussmann | A01D 41/127 |
| | | | | 56/10.2 A |
| 2009/0139194 | A1 * | 6/2009 | Chervenka | F16H 61/66259 |
| | | | | 56/10.2 G |
| 2010/0174456 | A1 * | 7/2010 | Beaudoin | E02F 9/2066 |
| | | | | 180/364 |
| 2010/0299048 | A1 * | 11/2010 | Schindler | F02D 41/021 |
| | | | | 701/103 |
| 2012/0067037 | A1 * | 3/2012 | Bohrer | A01D 75/187 |
| | | | | 60/450 |
| 2016/0031443 | A1 * | 2/2016 | Komatsu | B60W 30/143 |
| | | | | 701/93 |
| 2016/0037722 | A1 * | 2/2016 | Missotten | A01D 69/005 |
| | | | | 701/48 |
| 2016/0046278 | A1 * | 2/2016 | Matsuzaki | B60W 10/08 |
| | | | | 903/930 |
| 2016/0137204 | A1 * | 5/2016 | Morselli | B60T 15/46 |
| | | | | 701/53 |
| 2017/0370303 | A1 * | 12/2017 | Altmann | A01D 41/127 |
| 2018/0141436 | A1 * | 5/2018 | Muench | B60K 31/00 |
| 2018/0196441 | A1 * | 7/2018 | Muench | A01D 41/1274 |
| 2019/0090421 | A1 * | 3/2019 | Bollin | B60T 8/172 |
| 2019/0289787 | A1 * | 9/2019 | Heitmann | A01D 41/1271 |
| 2019/0320582 | A1 * | 10/2019 | Terryn | A01D 45/023 |
| 2020/0256291 | A1 * | 8/2020 | Noonan | F02M 35/086 |
| 2020/0323141 | A1 * | 10/2020 | Perez Ramirez | A01D 41/142 |
| 2020/0367434 | A1 * | 11/2020 | Nakabayashi | A01D 41/1208 |

FOREIGN PATENT DOCUMENTS

| | | | | |
|---|---|---|---|---|
| EP | 1243173 | A1 | 9/2002 | |
| EP | 1243174 | A1 | 9/2002 | |
| EP | 1419687 | A1 * | 5/2004 | ......... A01D 41/1274 |
| EP | 1680952 | A1 | 7/2006 | |
| EP | 2057880 | A2 | 5/2009 | |
| EP | 2921042 | A1 | 9/2015 | |
| EP | 2995191 | A1 | 3/2016 | |
| EP | 3542610 | B1 * | 3/2022 | ......... A01D 41/1271 |

OTHER PUBLICATIONS

European Patent Office, "Communication Under Rule 71(3) EPC," issued in connection with European Patent Application No. 20172974.6, dated Nov. 12, 2021, 12 pages. (non-certified machine translation included).

* cited by examiner

DRIVE SYSTEM FOR A HARVESTER

The present disclosure generally relates to a harvester, specifically a harvester with an adjustable drive system for varying crop throughput.

BACKGROUND

Agricultural harvesters are used to harvest crops from a field. Crop processing usually takes place in different stages within the harvest operation. For example, the crop is first chopped in a forage harvester and is threshed, separated and cleaned in a combine harvester. The harvester is driven by a drive engine, which is usually a (diesel) internal combustion engine. The drive engine drives the ground engagement equipment (wheels or crawler drives) of the harvester via a first drive train and the crop processing and/or conveying equipment of the harvester via a second drive train. In order to ensure that at least the optimum utilization of the harvester is achieved, it has been proposed to measure a measurement variable representative of the crop throughput and to control the speed of the harvester by varying the transmission ratio of the first drive train in order to comply with a desired crop throughput.

Some drive systems for harvesters have a propulsion speed that is controlled to maintain a desired throughput and/or a desired power of the drive engine. For this purpose, a comparison is carried out between a measured throughput or a measured power and an associated setpoint value, based on which the propulsion speed is controlled, i.e. a control loop for the speed control receives measured or predetermined values for the throughput or the power as setpoint and actual values and outputs control signals for an actuator to influence the speed. The input variable for a speed control, which usually contains another (inner) control loop, is therefore the speed. This approach has the disadvantage, among other things, that a limitation of acceleration to improve driver comfort is only possible with predictive throughput sensors and is carried out with difficulty by rescheduling a speed curve (see European Patent Appl. No. EP 2 921 042 A1). In addition, these controllers, insofar as they are equipped with PID controllers that determine the control signal, among other things, on the basis of an integral of the difference between the setpoint value and the actual value, have the disadvantage that the integral values integrate too high, if for example the setpoint value cannot be reached due to population densities that are too small, which then leads to incorrect control signals if the setpoint value can then be reached again, but the controller tries to reduce the integral value by means of excessive speeds. To avoid these errors, further measures are needed (anti-windup strategies).

SUMMARY

A harvester comprising: a drive engine connected via a first drive train to ground engagement equipment of the harvester and via a second drive train to crop processing equipment of the harvester; an actuator configured to adjust the transmission ratio of the first drive train to control the propulsion speed of the harvester; and a controller configured to receive setpoint and actual values dependent on the crop throughput of the harvester, the controller configured to calculate an acceleration signal based on the setpoint and actual values, the acceleration signal representing an acceleration of the harvester suitable for minimizing the difference between the setpoint and actual values, and to determine a control signal for controlling the actuator based on the acceleration signal.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
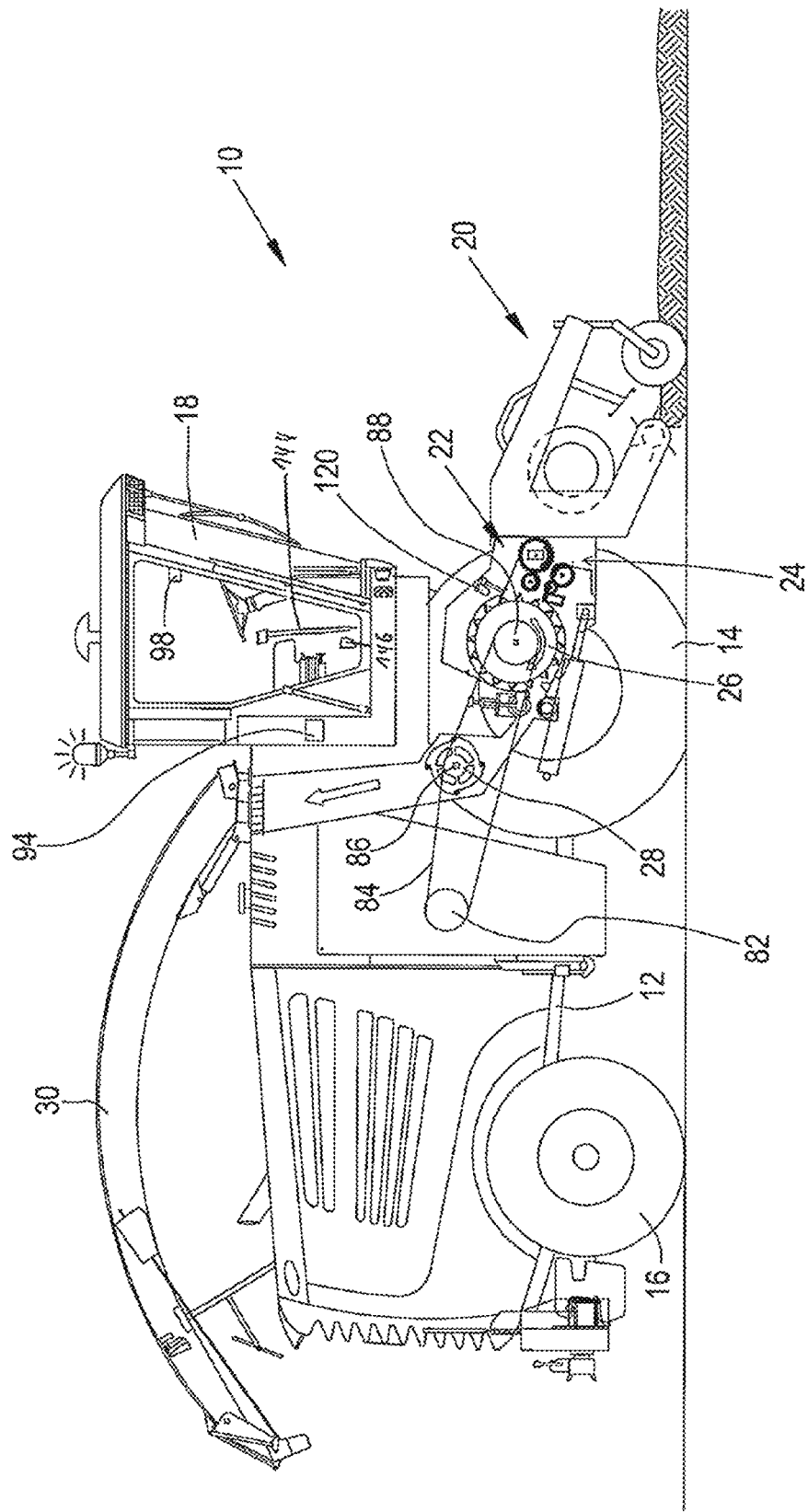
FIG. 1 shows a schematic lateral view of a self-propelled harvester in the form of a forage harvester.

A harvester includes a drive engine connected by a first drive train to the harvesters ground engagement equipment and a via second drive train to crop processing and/or conveying equipment of the harvester, and a control system that is connected to an actuator to control the harvesters propulsion speed. The control is conducted by means of setpoint values and actual values that depend on the crop throughput, on the basis of which the controller calculates an acceleration signal that represents an acceleration of the harvester that is suitable for minimizing the difference between the setpoint value and the actual value, and determines a control signal based on the acceleration signal for controlling the actuator.

In other words, the controller determines an acceleration signal based on the difference between a setpoint value and an actual value, both of which directly depend on or represent the crop throughput (for example as the sensor value of a sensor detecting a variable representing the throughput, for example for detecting a drive torque of a crop processing and/or conveying equipment of the harvester or a crop mat thickness) or indirectly depend on or represent the crop throughput, for example via the speed and/or power of the drive engine.

Thus the acceleration signal may not represent an error in the speed or a change in the speed to be adjusted to minimize the acceleration signal, but an acceleration of the harvester, which is suitable for minimizing the acceleration signal (to a value close to zero). On the basis of the acceleration signal, a control signal for the actuator is finally determined (by integration), which may preferably be limited by a maximum speed of the harvester that can be determined by an operator. In this way, the acceleration signal can easily be limited to upper and lower limits, which correspond to a maximum (positive) and minimum (negative) acceleration and which are fixed or changeable in order to improve operator comfort. Also, the errors are avoided where the control of the speed with a controller is an integral part, because the integral part is not necessarily required in the present case, since an acceleration signal is generated.

The controller may be able to be operated to calculate a first acceleration signal with respect to the power of the drive engine and a second acceleration signal with respect to the speed of the drive engine and to combine the two acceleration signals, in particular additively, into a single acceleration signal. The controller may be able to be operated to normalize the acceleration signal based on the difference between the lower and upper limits for the power and/or the speed of the drive engine. These limits are usually fixed for the harvester.

The controller may also be operated to modify the first and/or the second acceleration signal before the combination with the other acceleration signal on the basis of a curve that is dependent on the acceleration signal, which may in particular depend logarithmically or exponentially on the magnitude of the acceleration signal, in order to weight the affected acceleration signal more or less than the other acceleration signal. This weighting could also be carried out by a simple weighted sum, which would, however, lead to "unsmooth" behavior (because of the cut-off to limit the acceleration). Said curves should thus provide a smooth transition. The setpoint value for the power and/or speed of the drive engine can be set using an operator interface and/or by an automatic system.

The controller may include a monitoring device that can be operated to overlay correcting signals on the acceleration signal in the event of detected short-term underload or overload of the drive engine. Such a corrective signal may depend on the time derivation of the acceleration signal on the one hand, whereas on the other hand a corrective signal can be emitted in particular if the power of the drive engine exceeds a threshold of, for example, 95% of the nominal load and rises or falls over a number of measuring points and the speed is above a certain threshold near the minimum or maximum speed.

The disclosed drive system can be used on forage harvesters or any other harvesters, such as combine harvesters, cotton pickers or sugar cane harvesters. The possibly changing speeds of the drive engine influence the speeds of the processing and/or conveying equipment of the harvester via the second drive train, which can be acceptable within certain limits or can be compensated by variable transmission ratios in the second drive train (see, for example, German Patent Appl. No. DE 196 32 977 A1 or DE 10 2004 039 462 A1).

For this purpose, reference should be made to European Patent Appl. No. EP 1 243 173 A1, which describes a combine harvester with a hydrostatic first drive train. The respective throughput is measured on the basis of the drive torque of an axial threshing and separating rotor and the propulsion speed is automatically controlled by a controller so that the drive torque corresponds to a predetermined value. This predetermined value is entered (calibrated) by an operator by selecting a desired loss rate. Furthermore, the moisture of the crop can be detected and taken into account when adjusting the drive speed, i.e. the combine harvester travels more slowly with wet (and therefore harder to process) crop than with dry crop. The speed of the drive engine is not controlled by the controller but corresponds to a value that can be specified by the operator, which can change depending on the load.

For a similar arrangement, it was proposed that the operator enters a desired harvesting rate and that the controller controls the propulsion speed in order to maintain a desired throughput (European Patent Appl. No. EP 2 057 880 A2). Further, European Patent Appl. No. EP 2 921 042 A1 proposes predictive speed control of a harvester, with which the expected throughput is used to pre-plan the speed of the harvester that is to be controlled. Using the planned speeds, the accelerations or decelerations to be carried out are calculated and compared with certain limits that are designed to ensure driver comfort. If necessary, the planned speed curve will be replanned. There is no provision for intervention of the controller in the operating point of the drive engine.

European Patent Appl. No. EP 2 832 205 A1 proposes that the operator can specify not only a desired throughput (or the power of the drive engine), but also a working point of the drive engine. The controller thus controls not only the propulsion speed in terms of maintaining the desired throughput or the desired power of the drive engine, but also the working point of the drive engine in order to comply with both specifications. European Patent Appl. No. EP 3 326 446 A1, on the other hand, proposes to automatically adjust the speed of the harvester in such a way that the drive engine is operated with a predetermined power. For this purpose, an inner control loop is provided for the propulsion speed, to which are fed a setpoint value and an actual value for a throughput-dependent variable. An outer control loop is used to provide the setpoint value of the throughput-dependent variable for the inner control loop and receives as input variables setpoint and actual values for the power of the drive engine, while the actual value of the throughput-dependent variable is detected by a sensor. The operating point of the drive engine may depend on or be independent of the specified power, especially in the case of isochronous operation of the drive engine.

FIG. 1 shows a harvester 10 in the style of a self-propelled forage harvester in a schematic side view. The harvester 10 is built on a frame 12, which is supported by driven front wheels 14 and steerable rear wheels 16. The harvester 10 is operated from a driver's cab 18, from which a harvesting attachment 20 in the form of a collector is visible. In one example using the harvesting attachment 20, crop picked up from the ground, for example grass or the like, is delivered by a feed conveyor 22 with pre-press rollers, which are arranged within a feed housing 24 on the front of the forage harvester 10, to a cutterhead 26 arranged below the drivers cab 18 that is provided as a crop processing device, which chops the crop into small pieces and outputs it to a conveyor 28. The crop leaves the harvester 10 to a transport vehicle travelling side-by-side via an ejection spout 30 that is rotatable about a roughly vertical axis and adjustable in inclination. In the following, direction statements such as lateral, bottom and top refer to the forward movement direction V of the harvester 10, which runs to the right in FIG. 1.

Figure 2:
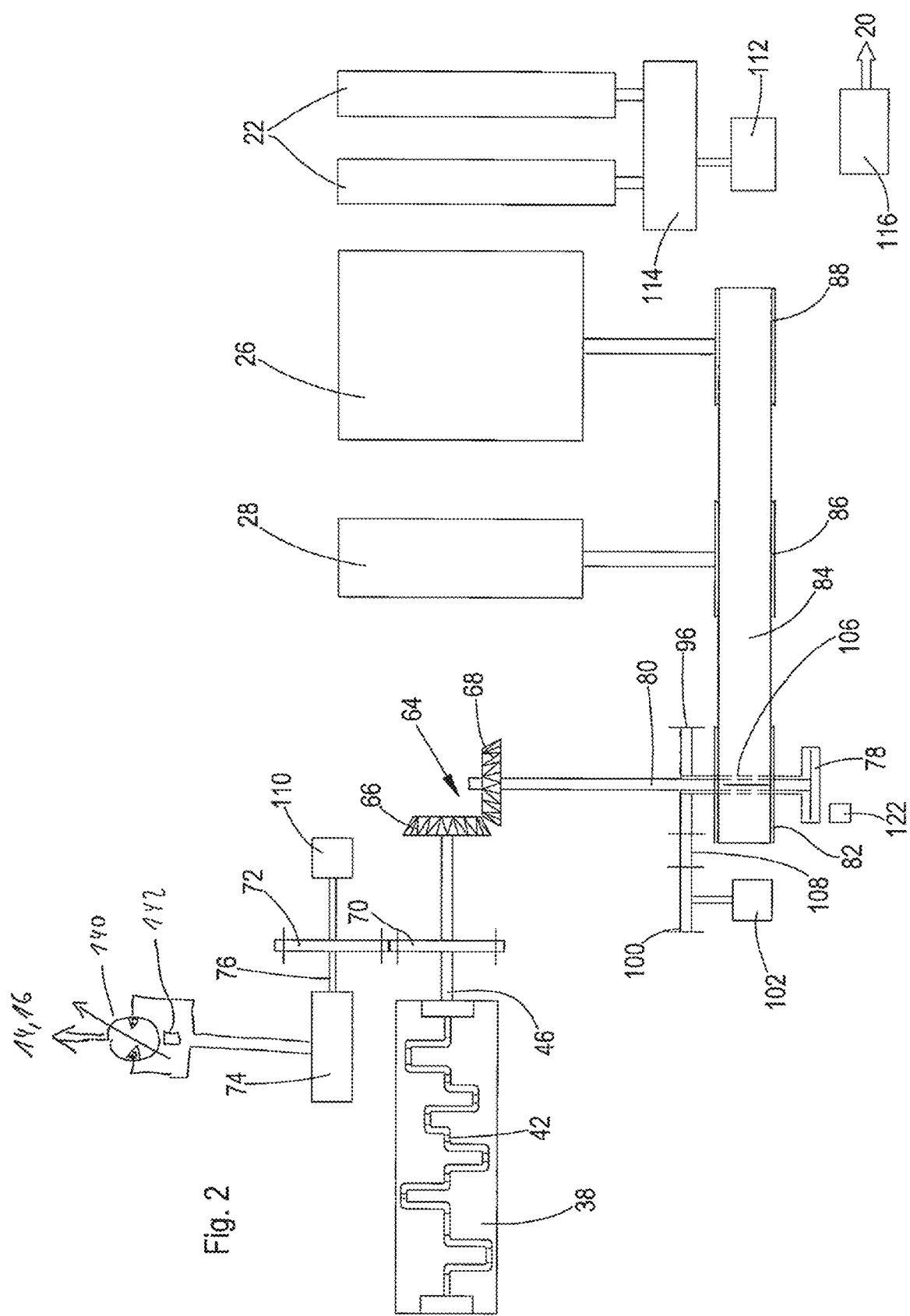
FIG. 2 shows a schematic plan view on the drive system of the harvester.

FIG. 2 shows a plan view of the drive arrangement of the harvester 10. In the rear area of the harvester 10 there is a drive engine 38, in particular in the form of a diesel engine. The drive engine 38 extends in the forward direction of the harvester 10 and comprises a crankshaft 42, which extends forward from the housing of the drive engine 38. in operation, the drive engine 38 drives, by crankshaft 42, a first longitudinal shaft 46 that is connected to the first bevel gear 66 of an angular gearbox 64. The first longitudinal shaft 46 also drives a pump unit 74 via gears 70, 72 and a second longitudinal shaft 76, wherein the pump unit 74 includes a hydraulic pump for driving hydraulic motors 140 for the propulsion of the harvester 10, a steering pump and a hydraulic pump for the oil supply of the controller of the hydrostatic drive for the propulsion of the harvester 10, and a first hydraulic pump 110, which is used to drive a first hydraulic motor 112 for driving the feed conveyor 22 via a gearbox 114. It would also be conceivable to drive other permanently driven elements via one of the gears 70, 72 or via a gear arranged in between (not shown), such as an electrical generator and/or a blower drive for the cooling air supply for the drive engine 38.

The second bevel gear 68 of the first angular gearbox 64 is connected to a transverse shaft 80, which extends through a hollow shaft 106 connected to the pulley 82 through to the side of the pulley 82 facing away from the angular gearbox 64 and is connected there to a clutch 78. The clutch 78 is connected on the output side to the hollow shaft 106, which also drives a second hydraulic pump 102 on the side facing the angular gearbox 64 via gears 96, 108 and 100, wherein the second hydraulic pump 102 drives a second hydraulic motor 116 that drives the harvester attachment 20. The clutch 78 makes it possible to switch the drive belt 84 and with it the cutterhead 26 and the conveyor 28 on and off.

A suitable controller 94 (see FIG. 1) is connected to an actuator 122 for switching the clutch 78. In road traffic mode, which can be selected by an operator interface 98, the controller 94 causes the actuator 122 to disengage the clutch 78, whereas in harvest mode it causes the actuator 122 to engage the clutch 78. Further details and possible modes of operation of the harvester 10 are described in German Patent Appl. No. DE 10 2014 219 205 A1, the disclosure of which is included in the present documents by reference.

The pump unit 74 forms a first drive train with the hydraulic motor 140, which has a drive connection via other drive mechanisms (gearboxes, shafts, not shown) to the ground engagement equipment for driving the harvester 10 (wheels 14 and/or 16), wherein the first drive train is driven by the drive engine 38. The angular gearbox 64 and the drive belt 84 (as well as the hydraulic pumps 102 and 110 and the hydraulic motors 112, 116) form a second drive train for driving the crop processing and/or conveying equipment of the harvester 10.

The controller 94 is set up to command an actuator 142 that can be electromagnetically or hydraulically operated via an electromagnetic valve arrangement that adjusts the displacement of the hydraulic motor 140 (and/or an adjustable hydraulic pump in the pump unit 74) to vary the transmission ratio of the first drive train and thus the forward speed V of the harvester 10. With a different embodiment, the controller 94 could directly control the speed of an electric motor to drive the wheels 14, 16. The controller 94 is also connected to a sensor 146 for detecting the position of a drive lever 144, with which the operator can specify a desired forward speed V of the harvester 10.

Figure 3:
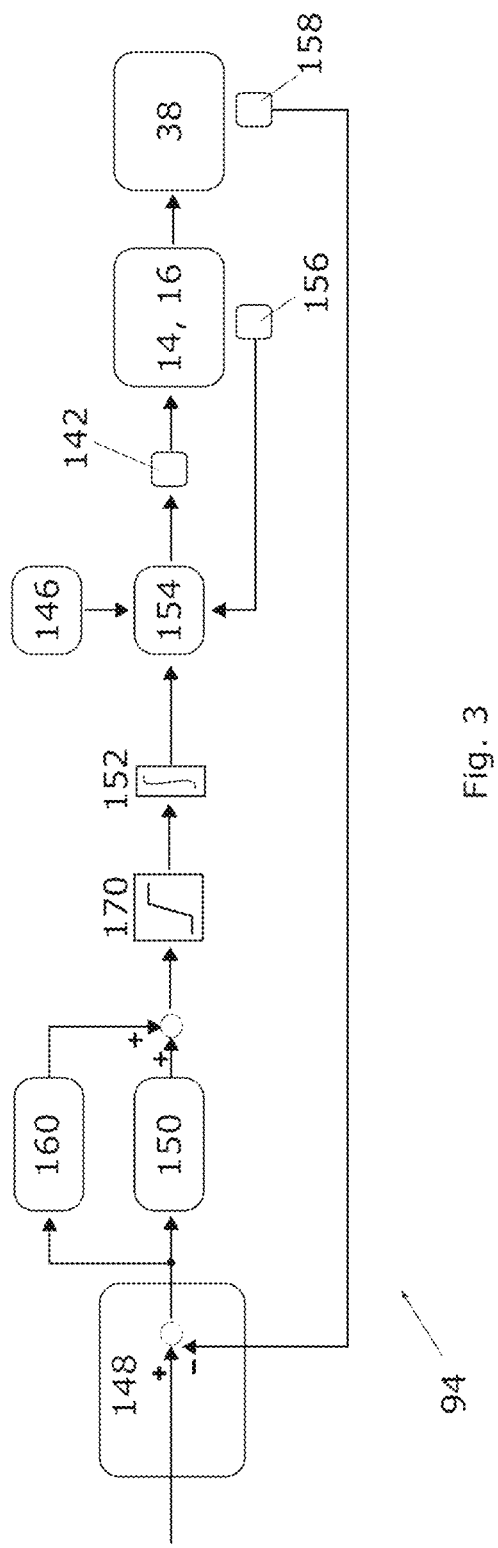
FIG. 3 shows a block diagram of a controller to control the propulsion speed of the harvester.

FIG. 3 shows a schematic of the controller 94. It comprises a preprocessing circuit 148, to which setpoint values regarding the speed and power of the drive engine 38 are fed, which can be entered or selected with the operator interface 98. In addition, the preprocessing circuit 148 is supplied with actual values regarding the speed and power of the drive engine 38 by an engine controller 158 of the drive engine 38 (or another suitable sensor system). Based on the setpoint values and the actual values, the preprocessing circuit calculates an acceleration signal, which it feeds to a controller circuit 150, which receives a further input signal from a monitoring device 160 that is connected to the output of the preprocessing circuit 148. An acceleration signal that represents an acceleration of the harvester 10 is available at the output of the control circuit 150. This magnitude of the acceleration is such that it leads to minimization of the difference between the setpoint and actual values of the speed and power of the drive engine 38. The acceleration signal is fed to an integrator 152, which outputs a setpoint value for the propulsion speed of the harvester 10 and feeds it to a speed controller 154.

The speed controller 154 controls the actuator 142, which in turn specifies the propulsion speed V of the harvester 10 for minimizing the difference between the setpoint value of the propulsion speed V and an actual value of the propulsion speed V detected with a speed sensor 156, i.e. said difference is brought as close as possible to zero. Instead of a control loop with a speed sensor 156, an open loop (without feedback by the speed sensor 156) can also be used if the speed controller 154 is aware of the relationship between the control signal to the actuator 142 and the forward speed of the harvester 10. The signal supplied to the speed controller 154 by the integrator can be delivered in particular as a fraction of a maximum speed of the harvester 10.

Figure 4:
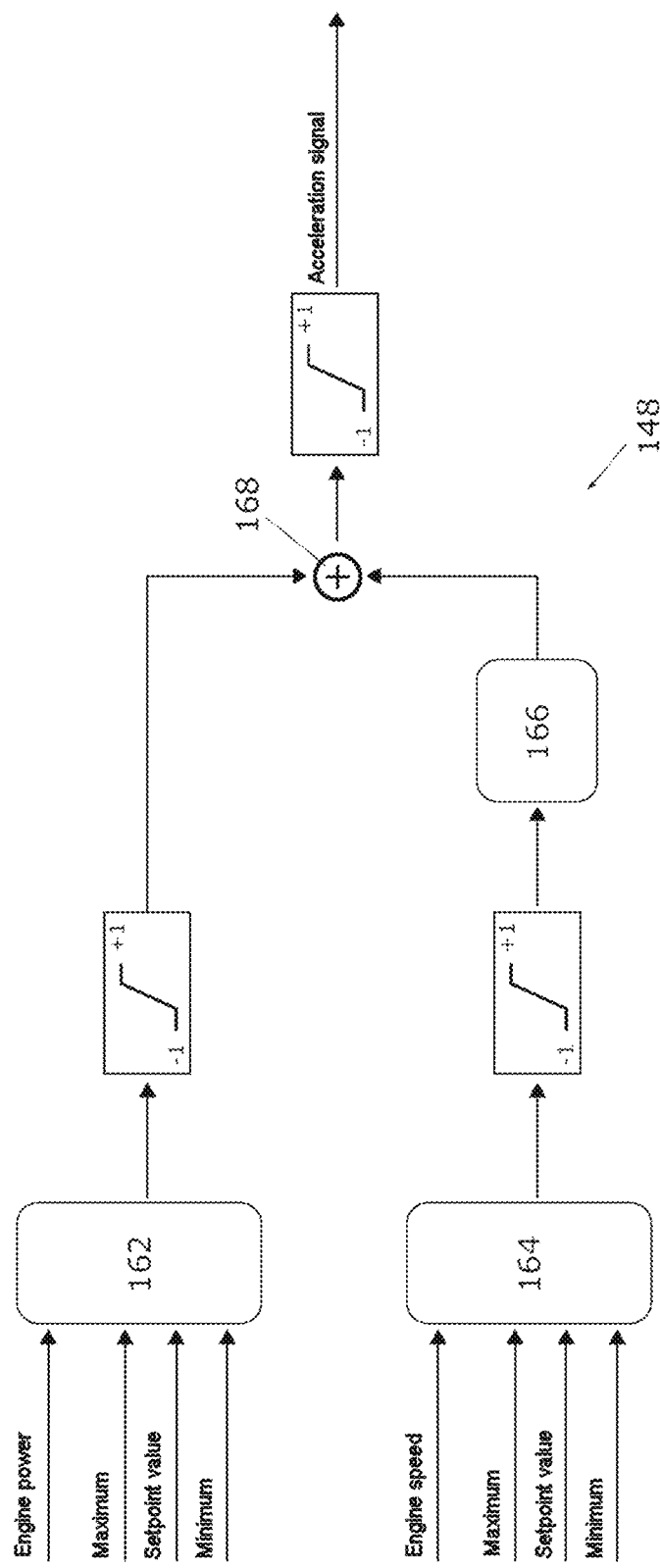
FIG. 4 shows a diagram of a pre-processing circuit of the controller.

FIG. 4 shows the pre-processing circuit 148 in detail. It comprises a first normalizer 162, to which the actual value of the power of the drive engine 38 is supplied by the engine controller 158, and to which values for a setpoint value of the power of the drive engine 38 as well as a maximum and a minimum for the power of the drive engine 38 can be input by the operator via the operator interface 98. Based on this, a first acceleration signal is calculated and passed to an adder 168. The first acceleration signal moves between an upper limit (maximum acceleration) and a lower limit (minimum, i.e. negative acceleration=deceleration), which are given here as values of +1 or −1. The first acceleration signal may correspond to the difference between the setpoint value and the actual value of the power of the drive engine 38, which is divided by the difference between the maximum and minimum of the power for normalization.

The preprocessing circuit 148 also includes a second normalizer 164, to which the actual value of the speed of the drive engine 38 is fed by the engine controller 158, and to which values for a setpoint value of the speed of the drive engine 38 as well as a maximum and a minimum for the speed of the drive engine 38 can be input by the operator via the operator interface 98 (or said values can be automatically determined, see below). Based on this, a second acceleration signal is calculated and passed to the adder 168 (via a converter 166). The second acceleration signal moves between an upper limit (maximum acceleration) and a lower limit (minimum, i.e. negative acceleration=deceleration), which are given here as values of +1 or −1. The second acceleration signal may correspond to the difference between the setpoint value and the actual value of the speed of the drive engine 38, which is divided by the difference between the maximum or minimum of the speed for normalization.

Figure 5:
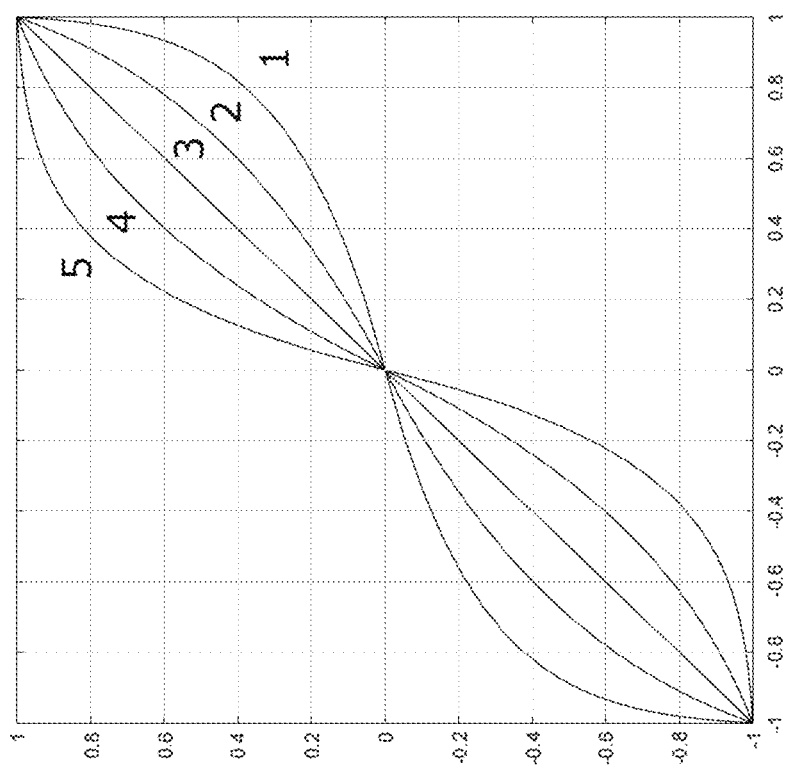
FIG. 5 shows a diagram concerning the factor by which the pre-processing circuit multiplies the second acceleration signal.

The converter 166 is used to multiply the second acceleration signal output by the second normalizer 164 by a factor dependent on the second acceleration signal, as shown in FIG. 5 as an example. In FIG. 5 a total of 5 curves are shown, wherein the input value of the converter 166 is drawn on the X axis and its output value is drawn on the Y axis. For curve 3 the input value is multiplied by 1, so that the input and output values are equal. Curves 1 and 2 are flatter than curve 3 for small values (and steeper than curve 3 for values beyond about +/−0.6. For example, curves 1 and 2 can be approximate exponential functions with different bases. Curves 4 and 5 are steeper for small values than curve 3 and flatter than curve 3 for values beyond about +/−0.5. For example, curves 4 and 5 can be approximate logarithmic functions with different bases. For each curve, the input value 0 is mapped to the output value 0 and the input values+/−1 are mapped to the output values+/−1. The curves 1 through 5 represent the aggressiveness with which the preprocessing circuit 148 reacts to the second acceleration signals that are output by the second normalizer 164. The higher the number of the curve, the more aggressive the response to the second acceleration signal, i.e. the higher the response to possible deviations in the engine speed from the setpoint value, and the higher the weighting of the second acceleration signal compared to the first acceleration signal and vice versa.

The output of the first normalizer 162 could also be connected to another converter that is similar to the converter 166 and that uses the same or another of the curves 1 through 5.

The first acceleration signal from the first normalizer 162 and the second acceleration signal from the second normalizer 164 are supplied to the adder 168 as input values after passing through the converter 166. At its output, the combined and still normalized acceleration signal is available to the control circuit 150. Thus, the first and second acceleration signals are merged into a single acceleration signal to achieve by means of the following controller elements that the combined acceleration signal is minimized. This achieves a high load of the drive engine 38 and enables a quick reaction in case of a maladjustment (overloading or underloading).

The control circuit 150 may be a proportional differential controller, to which the combined acceleration signal of the preprocessing circuit 148 is fed as an input value. The output signal of the control circuit 150 is fed to the integrator 152 after addition of the signal of the monitoring device 160. The output value of the control circuit 150 could additionally be made dependent on a time integrated input signal, which may be advantageous in some use cases, but may possibly require a reset logic.

Figure 6:
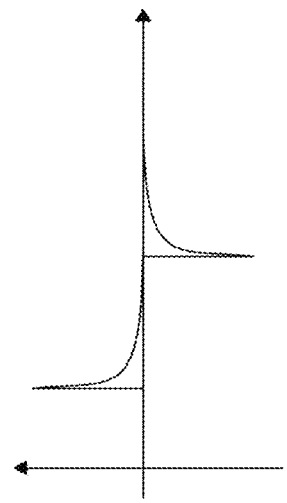
FIG. 6 shows a diagram for the signals of the monitoring device.

The monitoring device 160 monitors the power and speed of the drive engine 38, in that it is supplied it with the combined acceleration signal from the pre-processing circuit 148. The output signal of the monitoring device 160 is in particular the first time derivation of the combined acceleration signal from the preprocessing circuit 148. In the event of a sudden speed decrease or a sudden increase in the power of the drive engine 38, the monitoring device 168 outputs a negative signal to the control circuit 150, as shown in FIG. 6 on the right. In the event of a sudden increase in speed or a sudden decrease in the power of the drive engine 38, the monitoring device 168 outputs a positive signal to the control circuit 150, as shown in FIG. 6 on the left. These signals can be rectangular signals integrated over time and form relatively large, exponentially sloping pulses that lead to the avoidance of choking or high speeds of the drive engine 38 in the event of changes in concentration. The delivery of the positive or negative signal does not end until the internal combustion engine 38 begins to recover from the undesirable condition (decrease or increase in speed and/or power). Alternatively or additionally, a corrective (for example rectangular) signal can be output if the power of the drive engine is above a threshold of for example 95% of the nominal load and rises or decreases over a number of measuring points and the speed is above a certain threshold near the minimum or maximum speed.

The control circuit 150 or a limiter 170 connected in between it and the integrator 152 can normalize the output signal of the control circuit 150, which represents the acceleration of the harvester 10, to limits on the negative and positive acceleration that are predetermined or input by the operator via the operator interface 98 and that can be equal or different, (and/or simply cut off output signals of the control circuit 150 that exceed the limits) in order to subject the operator to accelerations only within fixed or entered limits in harvesting mode. In addition, the speed controller 154 limits the propulsion speed V of the harvester 10 to the value specified by the sensor 146, i.e. it uses the lower value of the sensor 146 or the integrator 152. In this context, it should also be noted that the driver could also enter or select a maximum speed of the harvester 10 via the operator interface 98 instead of via the drive lever 144. The drive lever 144 is then functionless or is used to reduce the speed below the maximum value that is entered with the operator interface 98 (whereby its adjustment range can be adjusted to the maximum speed).

The maximum and minimum values of the power and speed of the drive engine 38, which are used in FIG. 4 by the normalizers 162 and 164, can be stored as fixed values in the controller 94 or (preferably within certain, fixed limits) entered via the operator interface 98. The setpoint values of the power and speed of the drive engine 38, which are used in FIG. 4 by the normalizers 162 and 164, can be entered within certain fixed limits, which correspond in particular to the maximum and minimum values, via the operator interface 98 or can be specified by a higher-level control arrangement, which could be based, for example, on external specifications or economic considerations. The setpoint value of the power can be an absolute power for the respective speed, which could be measured in kW (i.e. the operator selects the speed via the operator interface 98 and then the power indicated to it by the operator interface 98 is read out from a stored characteristic of the drive engine 38 on the basis of the entered speed), or a relative power that defines a (percentage) proportion of a variable power available at the respective speed. It can therefore be specified, for example, that the harvester is operated at 80% of the available rated drive power. The controller 94 passes at least the setpoint value of the speed of the drive engine 38 and optionally also the setpoint value of the power to the engine controller 158, which controls the working parameters of the drive engine 38 (injection pump adjustment and similar) accordingly.

With the above versions, it is assumed that the operator or the higher-level control arrangement should select not only the setpoint power but also the setpoint speed of the drive engine. However, setting the speed poses certain problems, since in particular inexperienced operators may be tempted to select speeds that are too low and thus lead in the event of changes in concentration to choking the drive engine, or to select speeds that are too high and unfavorable to efficiency. A possible automatic procedure is therefore described below for specifying a suitable setpoint speed of the drive engine.

Figure 7:
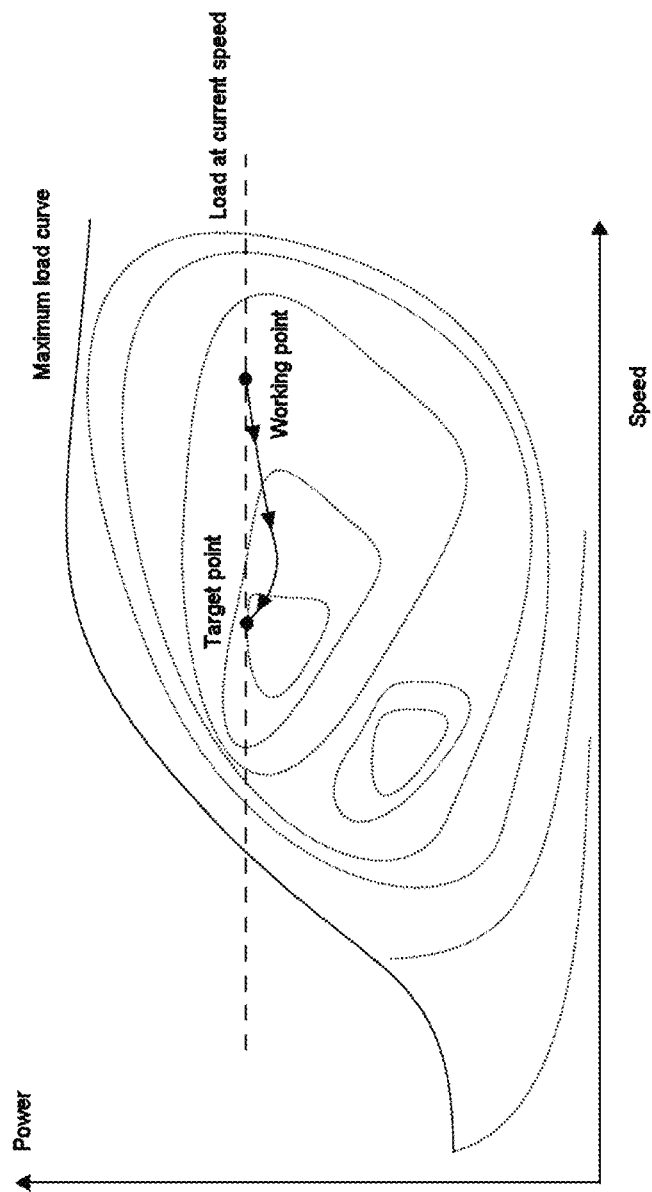
FIG. 7 shows an exemplary characteristic field of the drive engine of the harvester.
Figure 9:
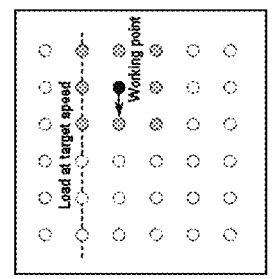
FIG. 9 shows a diagram for a second possible way of finding an operating point of the drive engine.

The aim here is to keep the fuel consumption as low as possible, but to move the harvester 10 over the field at a desired propulsion speed V and to draw a certain power from the drive engine 38. The procedure is based on an operating condition of the harvester 10 in which it has reached a certain speed specified by the operator via the drive lever 144 and the drive engine 38 is not operating at full load, but under partial load. In this case, it may be useful to move the operating point to maintain lower fuel consumption but to maintain the same power of the drive engine 38. The optimum point can be determined if the fuel consumption characteristics of the drive engine 38 are known. In the following, the characteristic field according to FIG. 7 is used, in which the speed is plotted on the X axis and the power is plotted on the Y axis. The dotted lines represent lines of the same specific fuel consumption.

The operator inputs a desired setpoint power of the drive engine 38 to the controller 94 and sets a desired propulsion speed with the drive lever 144, so (as long as the setpoint power is not exceeded) that the controller 94 causes the actuator 142 to move the harvester 10 across the field at the setpoint speed detected by the sensor 146. As long as the setpoint power is not reached, the controller 94 activates an energy efficiency mode. In this energy efficiency mode, the controller 94 detects the partial load condition and commands a new operating point for the engine controller 158. For this purpose, the controller 94 requires the current power (absolute or as a proportion of the maximum power) and the current speed of the drive engine and based on these two values determines the optimum operating point using the characteristic field and the specific fuel consumption identified therein. Similar action is taken if the setpoint value of the power is reached, i.e. the operating point of the drive engine 38 is set to a suitable speed with minimum specific fuel consumption, as shown in FIG. 7. For each setpoint value of the power, a suitable speed is automatically found that means a minimum specific fuel consumption.

Figure 8:
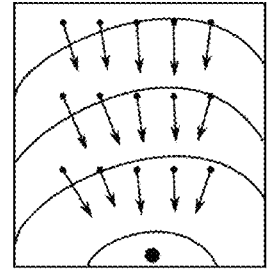
FIG. 8 shows a diagram for a first possible way of finding an operating point of the drive engine.

As shown in FIG. 7, it is possible to follow an optimum path when moving the operating point, which in turn leads to a lower fuel consumption. Here it is also possible to reduce the power, for example by reducing the speed, if this leads to reduced consumption. This optimal path can be determined by the controller 94 repeatedly updating the setpoint value of the operating point in relation to the current operating point. An easy but effective way to determine this path is shown in the negative gradient field of FIG. 8. We thus move towards the optimum setpoint along the gradients that run transversely to the lines of the same specific fuel consumption (shown dashed in FIG. 7). This gradually drags the operating point to the next local minimum in the consumption characteristic field.

If no gradient information is available, one can conduct an exhaustive search for a minimum in the neighborhood of the current working point, as shown in FIG. 0.

It should also be noted that the functions of the controller 94 described here could be integrated into the engine controller 158 or the control circuit 150, especially if the latter is already based on an optimizing technique, such as model-based predictive control (see European Patent Appl. No. EP 3 348 103 A1).

The invention claimed is:

1. A harvester comprising:
a drive engine connected via a first drive train to ground engagement equipment of the harvester and via a second drive train to crop processing equipment of the harvester;
an actuator configured to adjust a transmission ratio of the first drive train to control a propulsion speed of the harvester; and
a controller configured to:
receive setpoint and actual values dependent on a crop throughput of the harvester,
calculate an acceleration signal based on the setpoint and actual values, the acceleration signal representing an acceleration of the harvester suitable for minimizing a difference between the setpoint and actual values, and
determine a control signal for controlling the actuator based on the acceleration signal.

2. The harvester of claim 1, wherein the controller includes an integrator configured to receive the acceleration signal, the acceleration signal creating the setpoint value of a speed controller controlling the actuator, the control signal of the speed controller to the actuator limited by a maximum speed of the harvester that can be specified by an operator.

3. The harvester of claim 2, wherein the controller is configured to limit the acceleration signal to between an upper limit corresponding to a maximum acceleration and a lower limit corresponding to a minimum acceleration.

4. The harvester of claim 3, wherein the setpoint and actual values are based on at least one of power of the drive engine or speed of the drive engine.

5. The harvester of claim 4, wherein the controller is configured to:
calculate a first acceleration signal with respect to the power of the drive engine and a second acceleration signal with respect to the speed of the drive engine; and
combine the first and second acceleration signals into a combined acceleration signal.

6. The harvester of claim 5, wherein the controller is configured to normalize at least one of the first acceleration signal or the second acceleration signal based on a difference between the lower and upper limits for at least one of the power of the drive engine or the speed of the drive engine.

7. The harvester of claim 6, wherein the controller is configured to weight at least one of the first acceleration signal or the second acceleration signal before the combination of the first and second acceleration signals, the at least one of the first acceleration signal or the second acceleration signal weighted based on a curve that is dependent on a magnitude of the at least one of the first acceleration signal or the second acceleration signal.

8. The harvester of claim 7, wherein the setpoint value for the at least one of the power of the drive engine or the speed of the drive engine can be predetermined using an operator interface or automatically generated.

9. The harvester of claim 1, wherein the controller includes a monitoring device configured to overlay correcting signals on the acceleration signal in response to detection of a short-term underload or overload of the drive engine.

10. The harvester of claim 1, wherein the harvester is a forage harvester.

11. A controller comprising:
a preprocessing circuit to:
receive setpoint and actual values dependent on a crop throughput of a harvester, the harvester including a drive engine connected via a first drive train to ground engagement equipment of the harvester and via a second drive train to crop processing equipment of the harvester; and
calculate an acceleration signal based on the setpoint and actual values, the acceleration signal representing an acceleration of the harvester suitable for minimizing a difference between the setpoint and actual values; and
a speed controller to determine, based on the acceleration signal, a control signal for controlling an actuator, the actuator configured to adjust a transmission ratio of the first drive train to control a propulsion speed of the harvester.

12. The controller of claim 11, further including an integrator configured to receive the acceleration signal, the acceleration signal creating the setpoint value of the speed controller, the control signal limited by a maximum speed of the harvester that can be specified by an operator.

13. The controller of claim 12, wherein the controller is configured to limit the acceleration signal to between an upper limit corresponding to a maximum acceleration and a lower limit corresponding to a minimum acceleration.

14. The controller of claim 13, wherein the setpoint and actual values are based on at least one of power of the drive engine or speed of the drive engine.

15. The controller of claim 14, wherein the preprocessing circuit is configured to:
calculate a first acceleration signal with respect to the power of the drive engine and a second acceleration signal with respect to the speed of the drive engine; and
combine the first and second acceleration signals into a combined acceleration signal.

16. The controller of claim 15, wherein the preprocessing circuit is configured to normalize at least one of the first acceleration signal or the second acceleration signal based on a difference between the lower and upper limits for at least one of the power of the drive engine or the speed of the drive engine.

17. The controller of claim 16, wherein the preprocessing circuit is configured to weight at least one of the first acceleration signal or the second acceleration signal before the combination of the first and second acceleration signals, the at least one of the first acceleration signal or the second acceleration signal weighted based on a curve that is dependent on a magnitude of the at least one of the first acceleration signal or the second acceleration signal.

18. The controller of claim 17, wherein the setpoint value for the at least one of the power of the drive engine or the speed of the drive engine can be predetermined using an operator interface or automatically generated.

19. The controller of claim 11, further including a monitoring device configured to overlay correcting signals on the acceleration signal in response to detection of a short-term underload or overload of the drive engine.

20. The controller of claim 11, wherein the harvester is a forage harvester.

* * * * *